(12) United States Patent
Johansson

(10) Patent No.: US 10,264,737 B2
(45) Date of Patent: Apr. 23, 2019

(54) CULTIVATION SYSTEM

(71) Applicant: Peter Johansson, Njurunda (SE)

(72) Inventor: Peter Johansson, Njurunda (SE)

( * ) Notice: Subject to any disclaimer, the term of this patent is extended or adjusted under 35 U.S.C. 154(b) by 56 days.

(21) Appl. No.: 14/909,493

(22) PCT Filed: Jun. 25, 2014

(86) PCT No.: PCT/SE2014/000089
§ 371 (c)(1),
(2) Date: Feb. 2, 2016

(87) PCT Pub. No.: WO2015/020578
PCT Pub. Date: Feb. 12, 2015

(65) Prior Publication Data
US 2016/0165810 A1    Jun. 16, 2016

(30) Foreign Application Priority Data

Aug. 7, 2013 (SE) ...................... 1300528

(51) Int. Cl.
| *A01G 31/04* | (2006.01) |
| *A01G 9/20* | (2006.01) |
| *A01G 9/26* | (2006.01) |
| *A01G 7/04* | (2006.01) |

(52) U.S. Cl.
CPC .............. *A01G 9/20* (2013.01); *A01G 7/045* (2013.01); *A01G 9/26* (2013.01); *A01G 31/042* (2013.01); *Y02P 60/216* (2015.11)

(58) Field of Classification Search
CPC ..... A01G 31/045; A01G 31/047; A01G 31/04
See application file for complete search history.

(56) References Cited

U.S. PATENT DOCUMENTS

| 3,276,163 A * | 10/1966 | Oepen ................. A01G 31/042 47/65 |
| 3,327,425 A * | 6/1967 | Dosedla ............... A01G 31/045 47/60 |
| 4,068,405 A * | 1/1978 | Campbell ............ A01G 31/045 47/65 |
| 4,216,618 A * | 8/1980 | Haub ................... A01G 31/045 47/39 |
| 4,255,897 A * | 3/1981 | Ruthner ................ A01G 7/045 47/17 |
| 9,545,060 B2 * | 1/2017 | Wiggins ................... A01G 9/20 |

FOREIGN PATENT DOCUMENTS

| CA | 2768264 A1 * | 8/2012 | ............ A01G 31/04 |
| EP | 1 300 066 A1 | 4/2003 | |
| JP | H10-136790 A | 5/1998 | |
| WO | WO 8911217 A1 * | 11/1989 | ........... A01G 31/047 |

* cited by examiner

*Primary Examiner* — Kristen C Hayes
(74) *Attorney, Agent, or Firm* — Dilworth & Barrese, LLP

(57) ABSTRACT

Cultivation system (1) comprised of an endless cultivation track (2), that includes a number of support members (5) on which that is to be grown is moved along the cultivation track's length under illumination from a plurality of lighting units (7). A specific feature present cultivation system is that at least one of the lighting units (7) is arranged to be movable to and from a position (9), where it is intended to provide light, to and from a position at at least one support member (5) in which the lighting unit may be connected at the support member (5) and that movement of the lighting unit (7) may occur with the support member (5) to and from an arbitrary position along the cultivation track's length.

12 Claims, 6 Drawing Sheets

CULTIVATION SYSTEM

FIELD OF THE INVENTION

The present invention concerns a cultivation system in accordance with the claims.

BACKGROUND AND PRIOR ART OF THE INVENTION

The cultivation of plants has traditionally taken place in open outdoor fields, which means that the quality and the quantity of that which was cultivated is affected by variations in climate and weather. The impact of weather on the quality and quantity of that which is cultivated also means that farmers have a hard time selling outdoor crops before being harvested. Nowadays, customers increasingly, especially in countries with a highly developed trade and logistics, expect crops of the same quality (looks the same) regardless of good or bad weather. To allow a more uniform quality, it has become increasingly common for growing various plants in a controlled environment.

One way to achieve cultivation in an environment which is less exposed to variations in weather is greenhouse cultivation. Traditional greenhouse cultivation has the disadvantage of crops needing a large area to grow. In urban areas, where land prices are higher than in rural areas, cultivation in the open or in traditional greenhouses is therefore only performed on a limited scale (small scale).

With urbanization and increasing traffic problems in many countries, it has become more difficult to transport the fresh grown food, such as vegetables and other plants, to city centers. Increased environmental awareness among customers has also created a desire to cultivation must be as local as possible. Those problems and increased environmental awareness has in turn led to an increased need (interest) of growing near or in urban environments. With previous methods of cultivation, this has been difficult and costly to perform in, or adjacent to cities.

To increase the amount of crop grown per unit area of land, or floor space in the greenhouses, have different types of cropping systems developed where farming is done at multiple vertical levels. For example described in U.S. Pat. No. 3,327,425 is a variant of a cultivation track comprising substantially horizontal cultivation loops which are located at different vertical levels. The patent described in cultivation track, however, differs from the structure in accordance with the present application since it is based on older technology. The structure further includes no technology with which lighting units may be moved by the cultivation track load carrier or other components present in the cultivation system.

Another example of known cultivation track is described in SE 467643. The patent describes a cultivation track for the agricultural, forestry and horticulture. The cultivation track includes a number between a framework and pivotally attached at a distance from each other arranged support means, which are connected with each other through chains or the like. This design obtains an endless serpentine path. The serpentine forms a cultivation track in a side view a number of substantially V-shaped loops and artificial light are arranged from top to mainly highlight the asserted plants in the respective V-shaped loop. The design has the disadvantage that it is space consuming. Furthermore, the cultivation system according to its description has the disadvantage that it is time consuming to replace lamps and the like in this cultivation system which lacks a device by which the replacement of lamps or the like can be easily or automatically accomplished.

In the Swedish patent SE535207 describes a variant of a cultivation track which is enclosed in a movable unit such as a container or the like. The design under patent provides a good opportunity to control the climate in the cultivation. The design of the patent differs from the design in accordance with the present patent application when the structure of the patent contains at least one V-shaped loop. The cultivation track of patent also has the disadvantage of this lacks a functional device and, in accordance with the present application, with the lights or lighting devices can be replaced quickly if these suffer errors.

There are several problems with the patents described in cropping systems, where farming is done at different vertical levels. For example, there are problems with access to the components of a cultivation track in connection with the servicing and maintenance. To allow access for service and maintenance required service ducts and the like at the cultivation track's side. Service aisles have the disadvantage of these takes up floor space and vertical space above them.

A specific problem with existing types of cultivation tracks that include multiple loops at different vertical levels consist of the difficulty of replacing lighting devices, lamps and fluorescent tubes. When replacing lamps or servicing of lighting devices, this is done from the aforementioned service ducts and the like. In larger cropping systems the change of lighting devices such as lights in the higher-lying loops occurs at relatively high heights requiring ladders and the like to be used, which means obvious risks of falls.

In compact systems that are mounted in the container and the like causes the change of lighting units problems. For example, it may require removal of some components before it is possible for a person to replace a lighting unit. The process may also involve the production must be stopped and it grew removed from the cultivation system.

With the development of LED technology has the dimensions of the lighting units decreased, which has resulted in less space lighting solutions have been developed. This development has unexpectedly led to cultivation systems that may be made more compact types. If the cropping system is compact and includes a plurality of horizontal growing loops, this implies further problems with being able to replace the light-emitting devices.

PURPOSE OF THE INVENTION

The main object of the present invention is to provide an improved cultivation system which solves or reduces one or more of the above problems. The object is achieved with a cultivation track path in accordance with the claims.

BRIEF DESCRIPTION OF THE DRAWINGS

The present invention will be further described in the following detailed description with reference to the accompanying schematic drawings that exemplify the presently preferred embodiments of the invention.

DETAILED DESCRIPTION OF THE INVENTION

Figure 1:
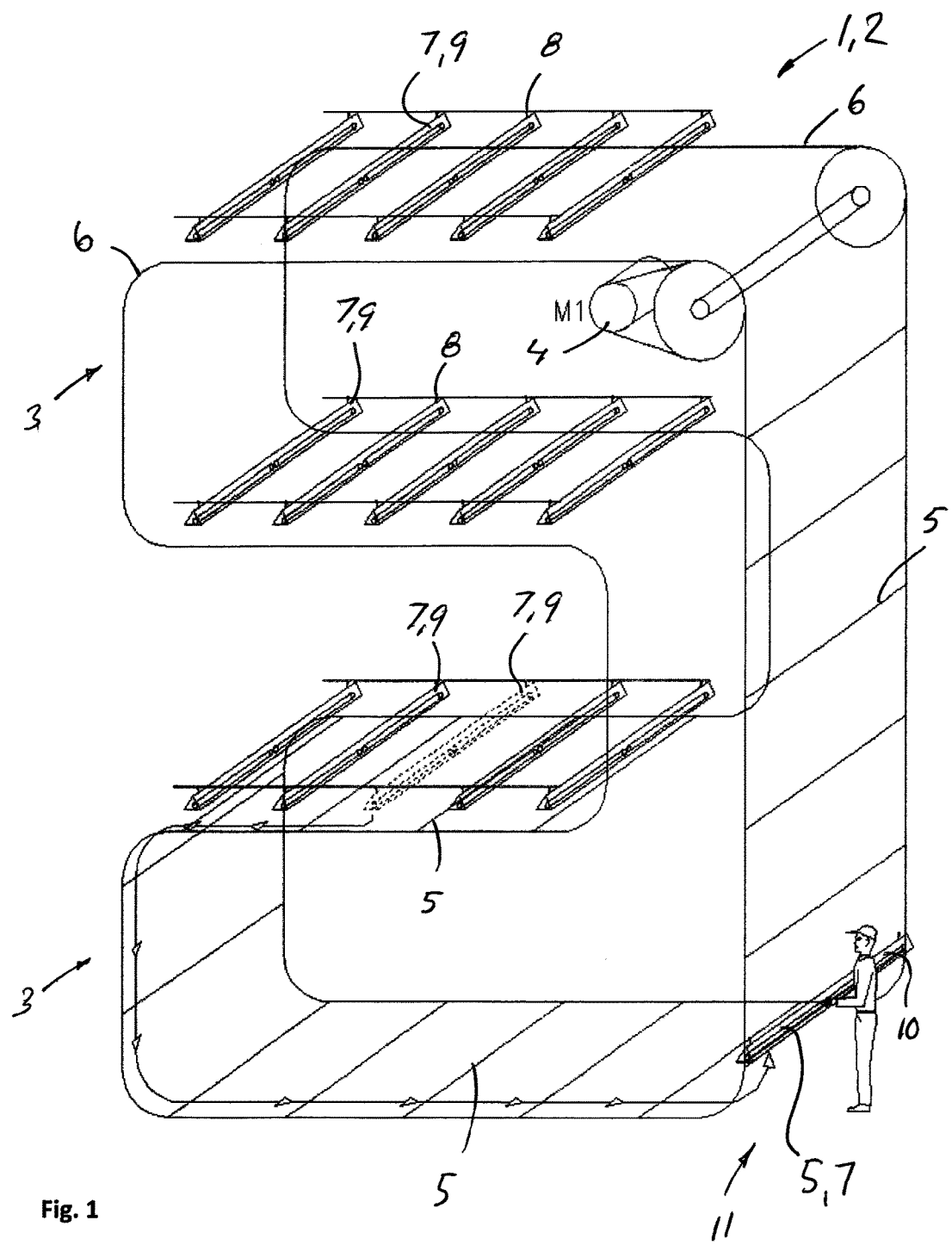
FIG. 1 shows schematically a variant of the present cultivation system which includes lighting units which may be replaced and moved by the cultivation track's supporting elements.

With reference to the figures, a cultivation system 1 is shown in accordance with an exemplary embodiment of the present patent application. The cultivation system 1 is comprised of at least one endless cultivation track 2 whose endless cultivation track 2 includes at least one first loop 3 and preferably at least two or more loops 3. The loop 3, or loops, path may vary within the scope of the invention. Thus, the loop may include sections that are directed vertically, horizontally, or in other for the purpose suitable directions. The loop may include at least one straight and/or curved section. The loop may also in alternative embodiments be comprised of at least one section with another for the purpose suitable form.

In order to move the cultivation track's loop, it is provided with at least one drive unit 4 which provides torque which drives the endless track. Preferably, the cultivation system includes at least one control system (not shown in figures) with which the cultivation track's functions are controlled.

The cultivation track is preferably intended to be used for growing vegetation such as plants and the like. It is also conceivable that algae or something other be cultivated in the system.

In FIG. 1 a relatively large cultivation track 2 which is preferably entirely or partly enclosed in a building or other enclosure is arranged to be movable or stationary. The cultivation track's size may vary widely within the scope of the invention. In alternative embodiments, the cultivation track may however advantageously be of a smaller type which may be moved in a container or the like.

The cultivation track 2 is comprised of a number, between a framework (not shown in the figures), or similar, of pivotally attached at a distance from each other arranged support members (support elements, load carriers) 5 which are connected with each other via chains 6 or the like. In the exemplary embodiment, the support members 5 are pivotally (rotatably, swingably) connected (attached) to the chains 6. The support members 5 may be spaced by a constant distance, or be deployed with varying distances between each other.

To supply light to that which is grown, such as the plants, the cultivation track is provided with a plurality of lighting units 7 which emit artificial light. Each lighting unit is in the exemplary embodiment suspended with, or otherwise connected to, at least one suspension device (connection device) 8. Alternatively the lighting units may be positioned with another suitable for the purpose technology to the cultivation track. Each lighting unit 7 is comprised one or more light emitting devices 7. The term lighting unit refers preferably to a unit which carries one or more light-emitting devices 7. The lighting unit 7 may preferably be self-supporting. The lighting units 7 of the present invention may preferably include LED-based light sources. In alternative embodiments, the lighting units 7 may be comprised of other types of light-emitting units than the LED.

A specific feature of the present cultivation system is that at least one lighting unit 7 is movably disposed to and from a position 9, where these are intended to emit light, to or from a position 10 at (or on or in) at least one support member. With the support member 5 the lighting unit 7 may be moved to and from an arbitrary position along the cultivation track's 2 length. Preferably, the lighting unit 7 is moved by the support member 5 to and from a position 11 in cultivation track 2 where the lighting unit in its entirety or parts of (parts, components) may be maintained and/or replaced. The cultivation track 2 may include multiple positions 11 where lighting units 7 in its entirety or in part (parts, components) may be maintained and/or replaced. With the described technique, the lighting units' positions may be shifted along the cultivation track's length.

The described technique may preferably be used in conjunction with cultivation track's lighting unit 7 being mounted at installation (assembly or disassembly of cultivation track). This may for example be accomplished by a support member 5 being moved to at least one position 11 along the cultivation track's 2 length where at least one lighting unit 7 is connected to the supporting member 5. After the lighting device is connected to the supporting member 5, the lighting unit is moved with the support member 5 to the place along the cultivation track's 2 length where the lighting unit 7 is installed in the connecting device 8. At this position the lighting device is installed by the lighting unit being moved from the support member 5 connected position to the light-emitting position. The procedure is repeated the required number of times so that of the lighting units to be installed are installed. The technique may also be used in reverse order when removing the lighting units, for example when removing the cultivation track. It is further conceivable that the described technique be used for movement of at least one lighting unit from a light emitting position to another light emitting position.

For controlling the speed of the endless track, lighting, temperature, humidity, and other parameters, the cultivation system is provided with, or connected to, the at least one control system. The control system preferably consists of a previously known control system therefore it is not described in more detail in this patent application. For supplying water and nutrients to plants grown in the cultivation system, the cultivation system preferably includes at least one irrigation means (not shown in figures).

The supporting members 5 are intended to support that which is cultivated and that which they are cultivated in. For instance, that which is cultivated may be grown in a number of cultivation trays (of known type) which are intended mainly to be used in the cultivation of forest plants and the like. In alternative embodiments, the support members also carry other suitable trays (containers), or the like, for plants.

A specific feature of the lighting units in accordance with the present invention is that these are comprised of at least one unit, such as a module, which essentially may be easily taken down and put up. Preferably lighting units include at least one quick coupling 12 with which the lighting units are connected to a connection device (suspension device) 8. The system may also preferably include at least one coupling for example energy supply.

Figure 2:
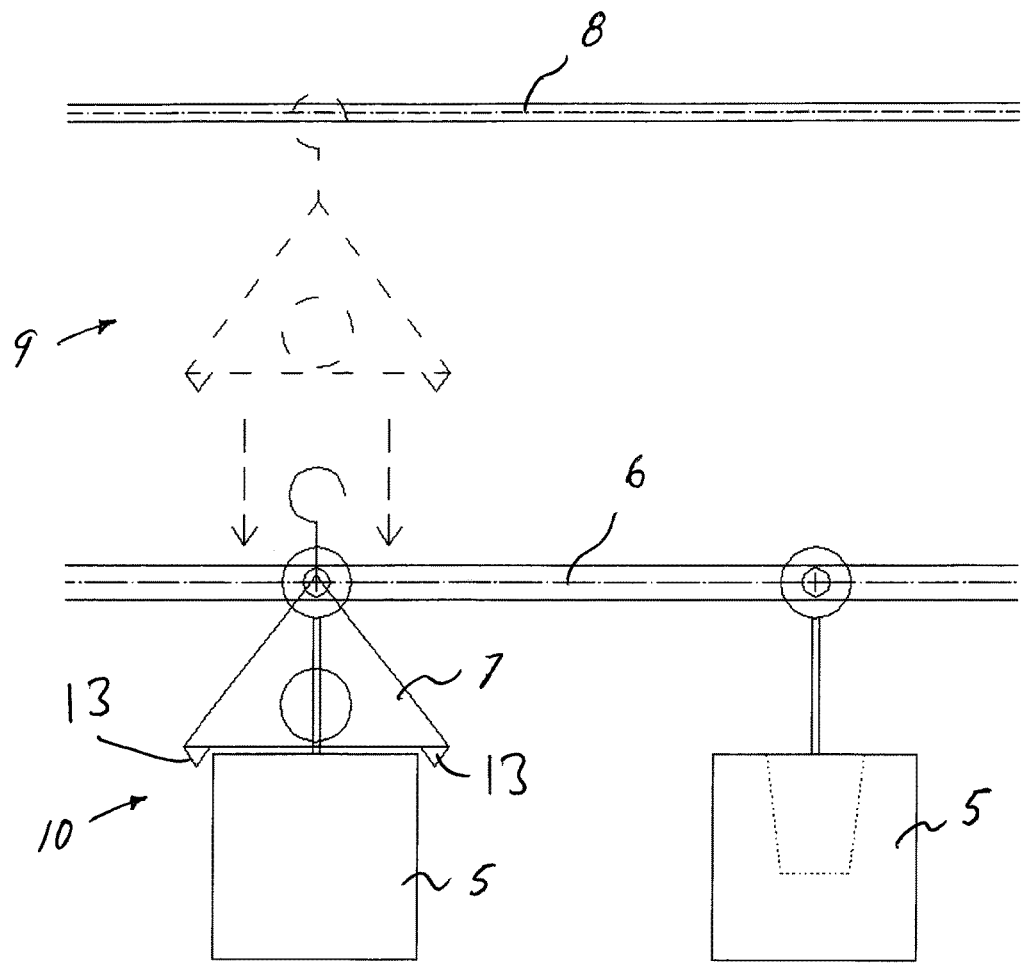
FIG. 2 shows schematically how the replacement of the lighting unit occurs.

Referring to FIG. 2, the principles of the change of the lighting unit 7 is accomplished by the lighting unit 7 being released from its connection device (suspension means) 8 or the like and subsequently moved to the support member 5 and connected or in another way connected at the load carrier 5.

In a first embodiment shown in FIG. 2, movement of the lighting unit 7 from the light-emitting position (suspended state, position) 9 takes place manually by a person or persons. The lighting unit 7 is, for example, removed and laid down on the support member.

In this embodiment, it is assumed that space is available for one or more persons at the cultivation system's sides. Upon removal of lighting devices, each lighting unit 7 is released from the light-emitting position 9 of at least one person and is placed down (positioned) on the support member 5. After the lighting unit 7 is connected to, or coupled with, the support member 5, the cultivation track (machine) is driven with the drive unit so that the support member 5 moves to a position 11 where the lighting unit 7 (on the carrier) may easily be taken out of the machine. In the figure, a support member 5 with a docking device, connection means, positioning means, or the like is shown.

In the exemplary embodiment, the docking apparatus includes a heel 13 or the like which positions the lighting unit 7 to the supporting body 5. In alternative embodiments it is conceivable that another suitable for the purpose docking technology or technology for linking or connecting the lighting unit with the support member (carrier) be used.

In alternative embodiments such as that shown in FIG. 3, movement of a lighting unit from the light emitting position at the supporting member 5 is accomplished with a switching device, replacement device/exchange device 14 or similar device.

With the exchange device 14 at least one lighting unit 7 may be disconnected and moved down to the support member 5 fully or partially automatically. In automatic operation for taking down each set of a lighting unit, this may be accomplished without a person being involved, or substantially involved.

Figure 3A:
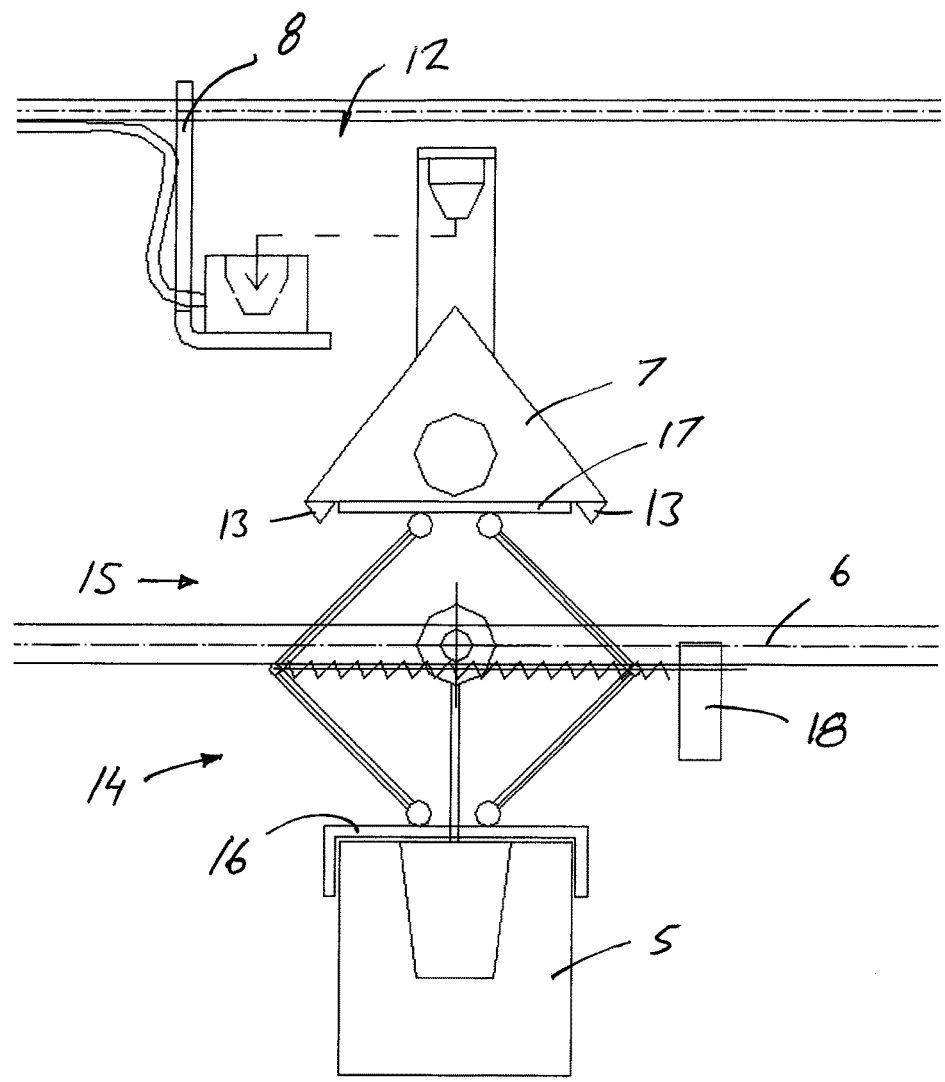
FIGS. 3 A and 3 B shows a variant of a load carrier which includes a function for taking out and putting in a lighting unit.
Figure 3B:
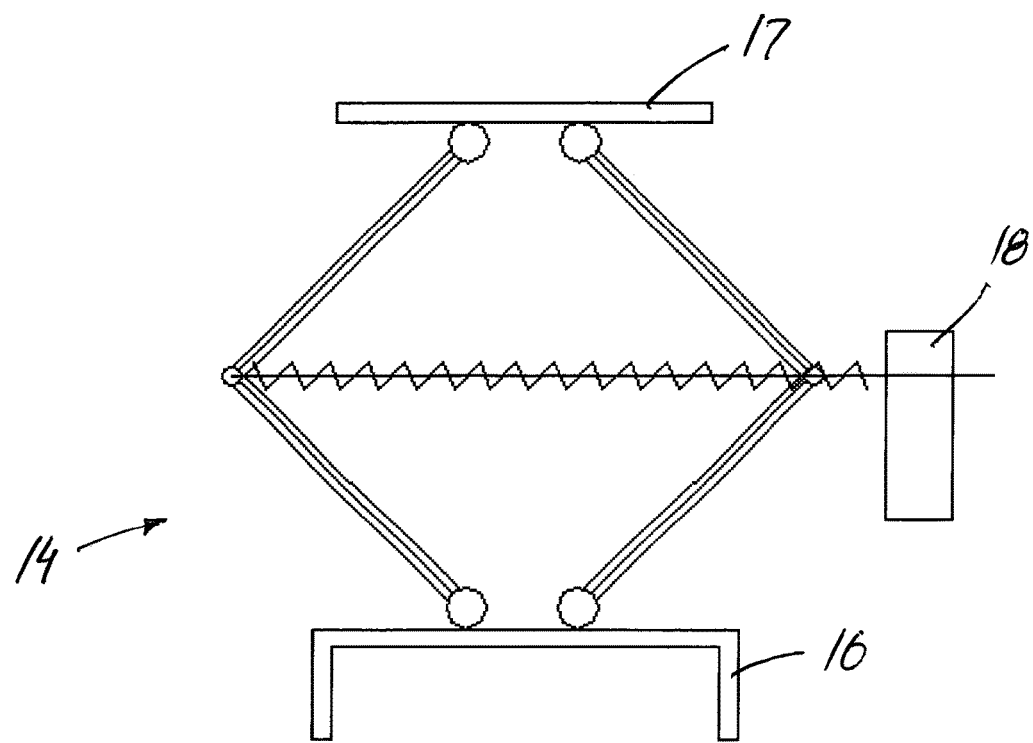
Figure 4:
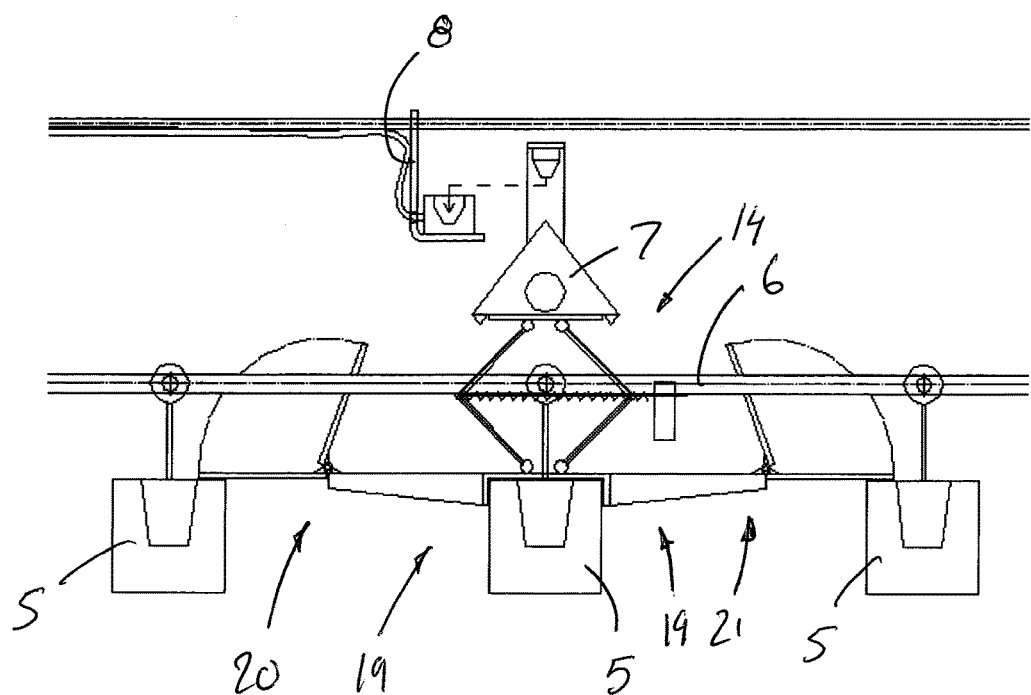
FIG. 4 shows a variant of a load carrier which includes a stabilizing device.
Figure 5:
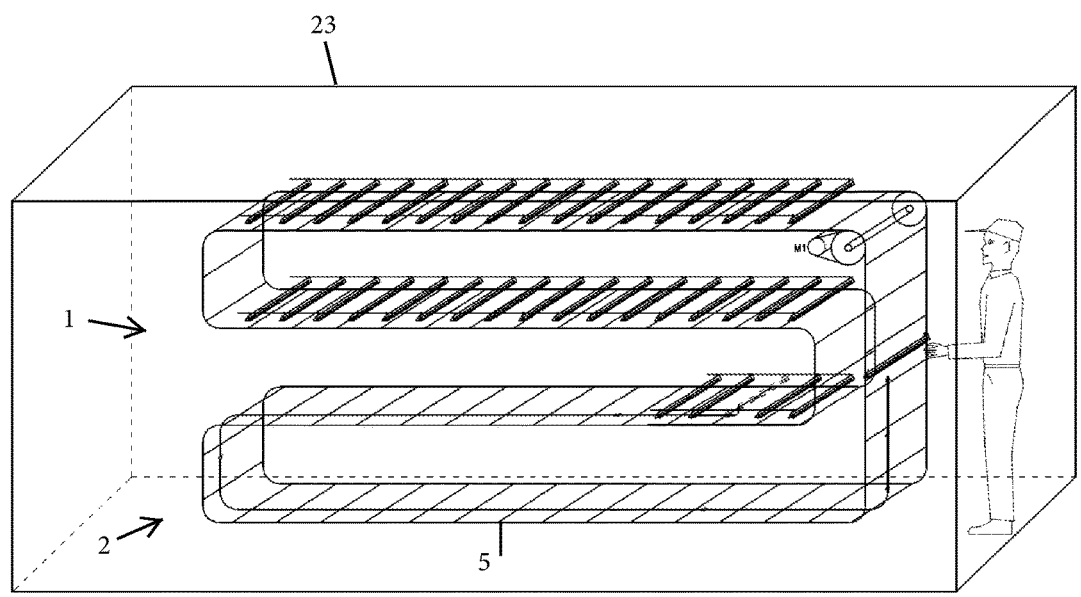
FIG. 5 shows the invention including a container.

FIGS. 3A and 3B shown an exemplary variant of an exchange device/switching device 14 with which the exchange of lighting units 7 fully automatically or partially automatically occur. The exchange device 14 includes at least one raising and lowering unit 15 which is moved to the position in the cultivation track where a lighting unit is to be moved from the light-emitting position (in the figure, the suspended position) 9 and moved to (in the figure down on) load carrier 5. During exchange the exchange device/switching device grips a lighting unit 7 with release of quick connection for electricity and, where appropriate, water (not shown in figures). After this the machine is run slightly forward or backward after which the lighting unit 7 is coupled together with the support member (a carrier) 5. After the lighting unit 7 is linked with the support member 5 the support member with the lighting unit 7 is moved to a position along the track's length where it may be maintained or lifted out of the machine. FIGS. 3 and 4 show also show a possible quick connection between the lighting unit and the connecting device (suspension device) 8. The quick coupling (quick connector) also preferably includes a quick connection device for supplying electrical energy and, where appropriate, a quick connection device for refrigerant, water or other lighting device 7.

In the exemplary embodiment, the exchange device/switching device 14 includes at least one connecting member 16 to the support member 5, at least one height adjustable platform 17 or the like, and at least one control unit 18 with which the raising or lowering of the platform 17 may occur. The exchange device/switching device 14 in the exemplary embodiment may include at least one drive unit. For example, it may be electrically powered with energy for example at least one accumulator. The drive unit may in alternative embodiments be pneumatically driven or driven with other technologies suitable for the purpose.

The transmission of control signals to the exchange device/switching device 14 may be done wirelessly or in another for the purpose suitable manner.

Referring to FIG. 4, a stabilizing device 19 which is intended to limit, or prevent, a rotation of the support member relative to the attachment points when the lighting unit 7 is moved from, or to, the light-emitting position (taken down or set up) is shown. In the exemplary embodiment the stabilization device 19 is connected between the relevant support member 5 (which is or will be connected with a lighting unit) and at least one adjacent second support member 5. In the figure, is shown an exemplary embodiment of the stabilization device 19, where it is comprised of at least one stabilizing support (arm) 20 to at least one first adjacent support member 5 and at least one second stabilizing support (arm) 21 to at least one other adjacent support member 5. Arms 20 and 21 may be comprised of two or more parts which may be pivoted around a common pivot axis with the function that the length of the coupled arms may be changed. In alternative embodiments, it is also conceivable that the first arm 20 and the second arm 21 be mutually arranged in a telescopic fashion. In alternative embodiments, the stabilization device 19 may alternatively be connected to the chain 6 or at another suitable for the purpose component in the cultivation track.

In alternative embodiments it is conceivable that the movement of the lighting unit 7 to a position 11 where replacement or repair may be done with a separate loop or the like. A separate loop refers to a loop which is not used for the movement of load carriers with cultivated plants.

It is further conceivable that a specifically designed supporting member 5 or other type of moving means be used to lift down and lifting up the lighting units. During replacement or maintenance of the lighting unit it is mounted to the cultivation track. After maintenance or replacement is accomplished, the specifically developed support member, or other transfer device, is lifted out.

The function of a fully or partially automatic switching of a lighting unit is particularly useful and time saving if the cultivation track is enclosed in a confined space such as for example a cropping system that is completely or partially enclosed in a movable unit 23 such as for example a container, movable building or other suitable for the purpose. The replacement of the lighting unit with the prior art, usually takes much longer to complete.

If the movable unit consists of a container, it may consist of a standard 20 foot ISO container which is adapted to the present purpose to enclose a cultivation track. In alternative embodiments, other types of enclosures may be used. The container length, width and height are not limiting for the present invention but may vary widely within the scope of the present invention. Thus, other sizes of standard containers may be used and specially designed movable enclosures suitable for the purpose may be used.

The movement of the cultivation system may be accomplished in several different ways. For example, this may be done by boat, truck or other suitable vehicle or mode of transport.

A major advantage with a cultivation system that is completely or partly enclosed in a movable unit is that the cultivation system may be in operation during the movement of the cropping system.

In alternative embodiments it is conceivable that the described technology, with which a movement of at least one lighting unit from one position to another position may be performed, may be used to move any other type of component or any other types of components (module or modules)

included in the cultivation system from at least one position to at least one other position in (or at) the cropping system.

In the detailed description of the present invention, design details may have been omitted that are apparent to persons skilled in the field of the device. Such obvious design details are included to the extent necessary for a proper function to be obtained for the present invention.

Although some preferred embodiments have been described in detail, variations and modifications within the invention may be apparent to those skilled in the art and all such are considered to fall within the scope of the following claims.

ADVANTAGEOUS OF THE INVENTION

With the present invention, a number of advantages are obtained. The key advantage is that at least one of the above mentioned disadvantages with known types of cultivation systems, is eliminated or reduced.

Another benefit of growing in controlled and closed environment is that unwanted variations and quality fluctuations are eliminated. Cultivation becomes a process that may be run again and again with the same results and outcomes which in modern market offers great advantages in terms of long-term planning and a better and more consistent quality. The risk of infestation by insects and vermin and the like is eliminated or substantially reduced with cultivation in a closed environment.

The cultivation system's design entails further that it may be made compact and the cultivation system involves a high production per unit volume.

The invention claimed is:

1. A cultivation system comprised of at least an endless cultivation track, a plurality of lighting units, and a number of support members on which that to be grown is moved along the cultivation track's length and illuminated by the plurality of lighting units, wherein
   the support members are pivotally attached at a distance from each other, and
   at least one of the lighting units is arranged to be moveable to and from a position, where it is intended to provide light, to and from at least one support member to which the lighting unit may be connected and that movement of the lighting unit may occur with the support member to and from an arbitrary location along the cultivation track's length.

2. A cultivation system in accordance with claim 1 and wherein: the system includes at least one stabilization device for stabilization of the support member-in conjunction with the movement of the lighting unit to and from the position to and from the support member respectively.

3. A cultivation system in accordance with claim 1 and wherein: the cultivation system is enclosed in a moveable unit.

4. A cultivation system in accordance with claim 1, wherein the lighting units are configured to be lowered towards and raised away from the supporting members.

5. A cultivation system comprising at least an endless cultivation track, a plurality of lighting units, and a number of support members on which that to be grown is moved along the cultivation track's length and illuminated by the Plurality of lighting units, wherein
   at least one of the lighting units is arranged to be moveable to and from a position, where it is intended to provide light, to and from at least one support member to which the lighting unit may be connected and that movement of the lighting unit may occur with the support member to and from an arbitrary location along the cultivation track's length, and
   the lighting unit at the position is connected to at least one connecting device by least one quick coupling.

6. A cultivation system comprising at least an endless cultivation track, a plurality of lighting units, and a number of support members on which that to be grown is moved along the cultivation track's length and illuminated by the plurality of lighting units, wherein
   at least one of the lighting units is arranged to be moveable to and from a position, where it is intended to provide light, to and from at least one support member to which the lighting unit may be connected and that movement of the lighting unit may occur with the support member to and from an arbitrary location along the cultivation track's length, and
   movement of the lighting unit between the position and the support member is accomplished by an exchange device/switching device.

7. A cultivation system according to claim 6 and wherein: the exchange device/switching device includes at least one connecting member contacting the support member and at least one height adjustable platform.

8. A method for exchange and maintenance of lighting units in a cultivation system using a system in accordance with claim 1 and wherein: at least one support member is moved to a position in close proximity of a lighting unit that is to be exchanged or maintained after which the lighting unit is moved to and connected to the support member, after which the support member with the connected lighting unit is moved to at least one second position along the cultivation track's length where the lighting unit may be maintained and/or exchanged after which the support member is moved to a third position where the lighting unit may be moved from the the support member.

9. A method in accordance with claim 8 and wherein: the movement of the lighting unit to the support member is accomplished by the exchange device/switching device.

10. A method in accordance with claim 8 and wherein: the movement of the lighting unit to the support member is accomplished manually.

11. A method for the installation of at least one lighting unit in a cultivation system using a system in accordance with claim 1 and wherein: the support member is moved to at least one position along the cultivation track's length where one lighting unit is connected to the support member after which the lighting unit is moved with the support member to a second position along the cultivation track's length where the lighting unit is to be installed after which the lighting unit is installed by the lighting unit being moved from the support member to a light emitting position after which the procedure is repeated with further lighting units.

12. A method for the removal of at least one lighting unit in a cultivation system using a system in accordance with claim 1 and wherein: the support member is moved to at least one position along the cultivation track's length where one lighting unit is connected to the support member after which the lighting unit is moved with the support member to a second position along the cultivation track's length where the lighting unit is removed from the support member after which the procedure is repeated with further lighting units.

* * * * *